US011151827B1

(12) United States Patent
Gant et al.

(10) Patent No.: US 11,151,827 B1
(45) Date of Patent: Oct. 19, 2021

(54) VIRTUAL ENTRY SYSTEM

(71) Applicant: Grand Dunes Entry Systems, LLC, Marysville, WA (US)

(72) Inventors: Justin Gant, Redmond, WA (US); Nicholas Schmidt, Mukilteo, WA (US)

(73) Assignee: Grand Dunes Entry Systems, LLC, Marysville, WA (US)

( * ) Notice: Subject to any disclaimer, the term of this patent is extended or adjusted under 35 U.S.C. 154(b) by 0 days.

(21) Appl. No.: 17/100,815

(22) Filed: Nov. 20, 2020

(51) Int. Cl.
| | |
|---|---|
| *B60R 25/00* | (2013.01) |
| *G07C 9/29* | (2020.01) |
| *G06F 16/29* | (2019.01) |
| *G07C 9/27* | (2020.01) |
| *G06K 7/14* | (2006.01) |

(52) U.S. Cl.
CPC .............. *G07C 9/29* (2020.01); *G06F 16/29* (2019.01); *G06K 7/1413* (2013.01); *G06K 7/1417* (2013.01); *G07C 9/27* (2020.01)

(58) Field of Classification Search
CPC .............. G07C 9/27; G07C 9/29; G06F 16/29
USPC ............................................................ 340/5
See application file for complete search history.

(56) References Cited

U.S. PATENT DOCUMENTS

| | | | | |
|---|---|---|---|---|
| 10,089,801 | B1 * | 10/2018 | Musabeyoglu | .......... H04W 4/80 |
| 10,447,864 | B1 * | 10/2019 | Rapp | ........................ G07C 9/38 |
| 10,685,516 | B1 | 6/2020 | Raduchel | |
| 10,846,958 | B2 | 11/2020 | Raduchel | |
| 2020/0349786 | A1 * | 11/2020 | Ho | ...................... G06K 9/00288 |
| 2020/0394861 | A1 * | 12/2020 | Meruva | .............. G07C 9/00904 |
| 2020/0402335 | A1 * | 12/2020 | Schoenfelder | ........... G07C 9/28 |
| 2020/0410796 | A1 * | 12/2020 | Sun | ..................... G07C 9/00857 |

FOREIGN PATENT DOCUMENTS

| | | |
|---|---|---|
| WO | WO 2020/160614 | 8/2020 |

OTHER PUBLICATIONS

Raspberry Pi Zero—Raspberry Pi. [Online] Available at: <https://www.raspberrypi.org/products/raspberry-pi-zero/?resellerType=home/> [Web page retrieved Nov. 20, 2020], 6 pages.
Orange Pi Zero—Orangepi. [Online] Available at: <http://www.orangepi.org/orangepizero/> [Web page retrieved Nov. 20, 2020], 5 pages.

(Continued)

*Primary Examiner* — Ahshik Kim

(57) ABSTRACT

A method performed by a system of one or more computers for operating a virtual entry system for a building. The method includes receiving, from a mobile device, a selection associated with information related to a navigation interface. The method includes sending, to the mobile device in response to receiving the selection, information related to a communication interface, the information related to the communication interface including a meeting code. The method includes receiving, from the mobile device, a first request to initiate a communication session between the mobile device and an electronic device, the first request including the meeting code. The method includes initiating, based on the first request, a communication session between the mobile device and the electronic device. The method includes receiving a second request to unlock a door of the building in response to the communication session.

24 Claims, 8 Drawing Sheets

(56) References Cited

OTHER PUBLICATIONS

Network Engineering Stack Exchange, "Understanding how VPNs work?", <https://networkengineering.stackexchange.com/questions/60022/understanding-how-vpns-work> [Web page retrieved Nov. 20, 2020], 3 pages.

Network Engineering Stack Exchange, "How are VPN Clients given IP addresses when they connect to VPN Routers such as VyOS? (How do Virtual IP Address Pools fit in?", <https://networkengineering.stackexchange.com/questions/46877/how-are-vpn-clients-given-ip-addresses-when-they-connect-to-vpn-routers-such-as> [Web page retrieved Nov. 20, 2020], 5 pages.

Super User, "How Does a VPN Manage Local IP Addresses", <https://superuser.com/questions/536577/how-does-a-vpn-manage-local-ip-addresses> [Web page retrieved Nov. 20, 2020], 4 pages.

Spiceworks, "VPN and DHCP", <https://community.spiceworks.com/topic/71863-vpn-and-dhcp> [Web page retrieved Nov. 20, 2020], 6 pages.

\* cited by examiner

VIRTUAL ENTRY SYSTEM

FIELD

In one exemplary aspect, the present disclosure is related to devices and methods for connecting to a virtual private network (VPN), and it is further related to using the VPN connection to route information between a remote server and a computing device, for example to facilitate a virtual entry system for a secured space, such as a building.

BACKGROUND

In general, connecting to a VPN requires a user to authenticate their identity by logging into the VPN. Once authenticated, the user can access data and connect to servers communicatively coupled to the VPN. However, if a user experiences network connectivity issues, the connection to the VPN may be lost, requiring the user to again log into the VPN.

Conventional virtual entry systems may include one or more guest call boxes located outside a building and a resident call box in one or more rooms of the building. If the building includes multiple units, then a resident call box may be placed inside each of the units. Therefore, the number of call boxes needed to service a building can increase with the number of units, resulting in high initial and maintenance costs. In the alternative, virtual entry systems may employ the resident cell phone or landline for buzzing in residents. However, the installation and maintenance of the guest call box is still significant.

Systems and techniques are needed to provide greater ease of connecting to a VPN. In addition, systems and techniques are needed to reduce or eliminate the number of call boxes required to service a building, which may include use of improved systems and techniques for connecting to a VPN.

SUMMARY

Systems and techniques are described herein for connecting to a VPN. For example, a microcontroller attachment that includes network interface controllers (NICs) can be attached to a microcontroller, and a computing device can be communicatively coupled (e.g., using an electrical cable) to the microcontroller attachment to connect the computing device to a VPN.

In some cases, the microcontroller attachment and microcontroller can be components of an entry subsystem. The computing device can be an electronic lock, which can connect to a virtual private network to which a virtual entry server is communicatively coupled. A guest arriving at a building can use the entry subsystem and virtual entry server to initiate a communication session between the guest's mobile device and an electronic device of a resident of the building. The resident can use the electronic device to unlock a door of the building, allowing the guest to enter.

In one example, a method performed by a system of one or more computers for operating a virtual entry system for a building is provided. The method includes receiving, from a mobile device, a selection associated with information related to a navigation interface. The method includes sending, to the mobile device in response to receiving the selection, information related to a communication interface, the information related to the communication interface including a meeting code. The method includes receiving, from the mobile device, a first request to initiate a communication session between the mobile device and an electronic device, the first request including the meeting code. The method includes initiating, based on the first request, a communication session between the mobile device and the electronic device. The method includes receiving a second request to unlock a door of the building in response to the communication session.

In some aspects, the method described above further includes sending to a computing system, instructions to unlock a door of the building in response to receiving the second request.

In some aspects, the second request is received from the electronic device. In some aspects, the second request is received from an additional electronic device.

In some aspects, the method described above further includes sending to the mobile device information related to the navigation interface.

In some aspects, the information related to the navigation interface includes one or more names of residents of the building. In some aspects, the information related to the navigation interface includes one or more unit numbers associated with residents of the building.

In some aspects, the information related to the navigation interface includes a selectable option to call a particular entity of the building. In some aspects, the particular entity of the building is a leasing office or a front desk of the office.

In some aspects, the mobile device receives the information related to the navigation interface through near-field communication, Bluetooth, or beacon technology. In some aspects, the mobile device receives the information related to the navigation interface in response to scanning a barcode or QR code.

In some aspects, the information related to the navigation interface includes a selectable option to initiate an automated attendant system that dictates at least a portion of the information related to the navigation interface. In some aspects, the portion of the information dictated by the automated attendant system includes one or more names of residents of the building. In some aspects, the portion of the information dictated by the automated attendant system includes one or more unit numbers associated with residents of the building.

In some aspects, the method described above further includes receiving, from the electronic device, a third request to generate a one-time credential for use in unlocking the door of the building. The method described above further includes generating the one-time credential in response to receiving the third request. The method described above further includes sending, to the mobile device, a request to sync the mobile device. The method described above further includes receiving an indication that the mobile device has been synced. The method described above further includes sending the one-time credential to the mobile device in response to receiving the indication that the mobile device has been synced.

In some aspects, the method described above further includes receiving an indication that the door was unlocked using the one-time credential. The method described above further includes preventing the one-time credential from being used to unlock the door in response to receiving the indication that the door was unlocked.

In another example, a method performed by an entry subsystem comprising one or more computers is provide. The method includes obtaining information related to a navigation interface. The method includes sending the information related to the navigation interface to a mobile device. The method includes receiving a request to unlock a door, the request being sent based on a communication session between an electronic device and the mobile device, the communication session being implemented in response to sending the information related to the navigation interface.

In another example, a computer-readable storage medium storing instructions that, when executed, cause one or more processors to perform operations is provided. The operations include obtaining information related to a navigation interface. The operations include sending the information related to the navigation interface to a mobile device. The operations include receiving a request to unlock a door, the request being sent based on a communication session between an electronic device and the mobile device, the communication session being implemented in response to sending the information related to the navigation interface.

In another example, an apparatus for validating one or more requests is provided. The apparatus comprises one or more processors and one or more non transitory machine readable storage media containing instructions which when executed on the one or more processors, cause the one or more processors to perform operations. The operations include obtaining information related to a navigation interface. The operations include sending the information related to the navigation interface to a mobile device. The operations include receiving a request to unlock a door, the request being sent based on a communication session between an electronic device and the mobile device, the communication session being implemented in response to sending the information related to the navigation interface.

In some aspects, the information related to the navigation interface is obtained from the virtual entry server.

In some aspects, the request to unlock the door is received from the electronic device. In some aspects, the request to unlock the door is received from the virtual entry server, which receives the request from the electronic device. In some aspects, the request to unlock the door is received from a smart home device.

In another example, a virtual entry system is provided. The virtual entry system includes a network, a virtual entry server in communication with the network, and an entry subsystem in communication with the network, the entry subsystem communicatively coupled to an electronic lock configured to selectively lock a lockable structure. The entry subsystem includes a microcontroller device. The microcontroller device includes one or more processors and one or more non-transitory machine-readable storage media. The microcontroller device includes a first network interface controller (NIC) configured to communicate with a first dynamic host configuration protocol (DHCP) server to receive a first DHCP address and configured to establish a virtual private network (VPN) connection for the electronic lock to communicate with a remote server, the first NIC configured to be communicatively coupled to the electronic lock. The microcontroller device includes a second NIC configured to receive a second DHCP address from a second DHCP server running on the microcontroller device and send the second DHCP address to the electronic lock.

In some aspects, a first computing device in communication with the network is configured to receive information related to a navigation interface from the virtual entry server. In some aspects, the first computing device is configured to receive the information related to a navigation interface using near-field communication (NFC), Bluetooth, or beacon technology. In some aspects, first computing device is configured to receive the information related to a navigation interface over a network. In some aspects, the first computing device receives the information related to the navigation interface in response to an application of the first computing device determining that the first computing device is within a threshold distance of the entry subsystem.

In some aspects, the application of the first computing device includes a location based service that determines a geographic location of the first computing device.

In some aspects, a second computing device in communication with the network is configured to send a request to unlock the lockable structure to the virtual entry server over the network. In some aspects, the virtual entry server is configured to send, to the entry subsystem over the network, instructions to unlock the lockable structure, in response to receiving the request to unlock the lockable structure. In some aspects, the entry subsystem is configured to send a door unlock signal to the lockable structure in response to receiving the instructions to unlock the lockable structure.

In some aspects, the entry subsystem comprises the electronic lock.

In some aspects, the first computing device receives the information related to the navigation interface in response to scanning a barcode or QR code.

In some aspects, the information related to the navigation interface includes a selectable option to initiate an automated attendant system that dictates at least a portion of the information related to the navigation interface. In some aspects, the portion of the information dictated by the automated attendant system includes one or more names of residents of the building. In some aspects, the portion of the information dictated by the automated attendant system includes one or more unit numbers associated with residents of the building.

In some aspects, the microcontroller device further comprises a proximity card reader.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
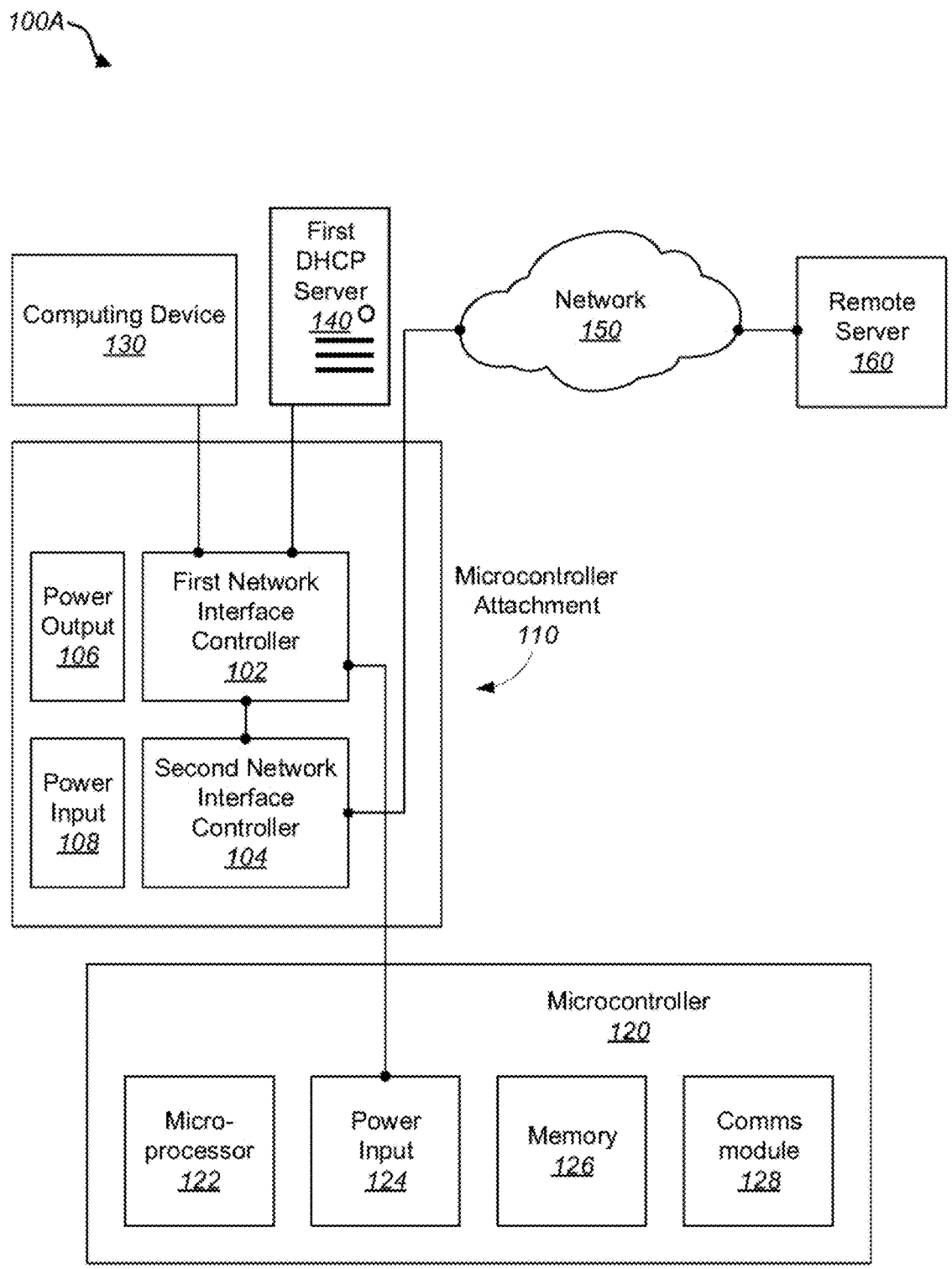
FIG. 1A is block diagram of a microcontroller system that includes a microcontroller attachment communicatively coupled to a microcontroller.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Virtual Private Networks (VPNs) provide a secure way for users to remotely connect an electronic device to a network (e.g., an office or school network) in which the device would otherwise not be within proximity of. Connecting to a VPN typically includes first connecting to a local network, then entering one or more credentials into a VPN interface. If the connection to the VPN is lost (e.g., if a device loses its connection to the local network) then a user must typically reenter their credentials. Therefore, a connection loss can be frustrating and time-consuming.

As can be appreciated, the process of connecting to a VPN can be simplified using a device that establishes a VPN connection with little or no input from a user. In that regard, exemplary embodiments are described herein of a microcontroller device for connecting to a VPN that establishes a VPN connection with little or no input from a user.

In one exemplary embodiment, the microcontroller device includes a pair of network interface controllers (NICs). In another exemplary embodiment, a microcontroller attachment is coupled to a microcontroller and the microcontroller attachment includes a pair of NICs. A first network interface controller (NIC) can be configured to communicate with a first dynamic host configuration protocol (DHCP) server and establish a VPN connection. A second NIC can be configured to receive a second DHCP address from a second DHCP server running on the microcontroller or the microcontroller device and send the second DHCP address to a device capable of connecting to a network. The device capable of connecting to the network can connect to the VPN through a communicative coupling to the microcontroller device, e.g., through a coupling to the first or second NIC.

Such an exemplary microcontroller device can be used to simplify the process of connecting a computing device to a VPN. For example, in some implementations, the computing device can simply be plugged into the microcontroller device to connect to a VPN, reducing or eliminating any additional steps (e.g., log in steps) required when establishing the VPN connection. In general, the computing device can be any electronic device that can connect to a network.

The exemplary microcontroller device may be used to improve secure network systems. For example, the microcontroller device described herein can be used to facilitate remote, secure entry of a building. In that regard, virtual entry systems and methods for facilitating remote, secure communication between a resident of a building and a guest (to enable, for instance, remote, secure entry to the resident's building) are described herein. For example, a guest arriving at a building can receive on their mobile device a navigation interface that the guest can use to enter or search for a name or unit number of a particular resident of the building. Upon selecting the name or unit number of the particular resident, a virtual entry server can send to the guest's mobile device information related to a communication interface, such as a meeting code, to initiate a communication session between the mobile device and an electronic device of the particular resident.

In further aspects, the resident can remotely unlock the door of the building, for example, by selecting an option to unlock the door using a user interface of the electronic device, which communicates the request to unlock the door to the virtual entry server. The door can be physically coupled to an electronic lock. In response to the request to unlock the door, the virtual entry server can transmit a signal to an entry subsystem that includes or is communicatively coupled to the electronic lock. Upon receiving the signal from the virtual entry server, the entry subsystem can communicate instructions to the electronic lock to unlock the door, allowing the guest to enter the building.

To ensure the security of the virtual entry process described above, the virtual entry system includes an entry subsystem having a microcontroller device connected to a VPN to which the virtual entry server is also connected. The microcontroller device can ensure communications between the entry subsystem and the virtual entry server are secure.

The systems and techniques described herein can be used to achieve several advantages as compared to existing systems and techniques for establishing a VPN. For example, one advantage provided by the microcontroller device is the simplicity of establishing a VPN connection. Whereas conventional systems may require a user to connect to a network and input a password, the disclosed embodiments of the microcontroller device can simplify the process of establishing a VPN by instead requiring only that a computing device is plugged into a port of the microcontroller device. In addition, because the computing device can send and receive data through a physical coupling, the chance of being disconnected from the VPN due to a network error can be reduced or eliminated.

The microcontroller device, together with the connected computing device(s), define components of an exemplary embodiment of a virtual entry system. Such virtual entry systems and their methods of use provide advantages at least in terms of reducing on-site hardware for secure building entry. For example, guest call boxes that are typically placed outside of a building and resident call boxes that are typically placed inside each unit of a building can be replaced with the components of the virtual entry system. As a result, instead of communicating using call boxes, a guest and resident can simply use their respective computing devices to communicate. Therefore, building managers can save time and money by avoiding the initial installation of the call boxes, the cost to power the call boxes, and their downstream maintenance and operation costs. Furthermore, conventional call boxes can be prone to hardware failures, which can be reduced or eliminated by implementing the disclosed virtual entry system. In addition, the virtual entry system provides an alternative for those buildings, especially older buildings, that may not include certain physical requirements to support a conventional call box (e.g., in terms of electrical wiring in the building).

Various aspects of the systems and methods described herein will be discussed below with respect to the figures. More specifically, exemplary embodiments of an improved microcontroller system (or device) for connecting to a VPN will first be described with respect to FIGS. 1A, 1B, and 2. Thereafter, an exemplary embodiment of a virtual entry system having an entry subsystem defined at least in part by a microcontroller device connected to a VPN to which a virtual entry server is also connected, will be described with respect to FIGS. 3-7.

FIG. 1A is block diagram of an exemplary embodiment of a microcontroller system 100A that includes a microcontroller attachment 110 communicatively (and optionally physically) coupled to a microcontroller 120. In general, the microcontroller 120 provides basic computing functionality, and the microcontroller attachment 110 provides added computing functionality to the microcontroller 120 for connecting to a VPN in a simplified manner. Although exemplary embodiments of the microcontroller system 100A will be described herein as having a microcontroller attachment 110 communicatively (and optionally physically) coupled to a microcontroller 120, it should be appreciated that the microcontroller attachment 110 and microcontroller 120 may instead be configured as an integrated microcontroller device, as described in greater detail with respect to FIG. 2. In that regard, the term "microcontroller device" may be generally used herein when describing improved systems and techniques for connecting to a VPN.

The microcontroller 120 can be any single board computer that includes a microprocessor. In some implementations, the microcontroller 120 is a Raspberry Pi microcontroller, such as a Raspberry Pi Zero or an Orange Pi microcontroller such as an Orange Pi Zero LTS. The microcontroller 120 includes a microprocessor 122, which can be any integrated circuit that includes a central processing unit (CPU). The microcontroller 120 can further include a memory 126, which can store data to be retrieved by one or more of the components of the microcontroller.

The microcontroller 120 further includes a power input 124, which can be an electrical connection through which the microcontroller can receive electrical power. In some implementations, the power input 124 can receive electrical power from a power grid (not shown). In the example of FIG. 1A, the power input 124 receives electrical power from a first network interface controller (NIC) 102 of the microcontroller attachment 110 through an electrical connection to the first NIC 102.

The microcontroller 120 can further include a communications module (comms module) 126. The communications module 126 can include one or more of an Ethernet port, an integrated wireless local area network (LAN), a Bluetooth communications unit, and one or more ports such as an HDMI, mini-HDMI, or USB port.

The microcontroller 120 is communicatively coupled to the microcontroller attachment 110 for connecting a computing device 130 to a network, such as a VPN. More specifically, in the depicted exemplary embodiment, the microcontroller attachment 110 includes the first NIC 102, which is communicatively coupled to the microcontroller 120 via one or more electrical connections. The first NIC 102 is configured to communicate with a first DHCP server 140 e.g., to retrieve a DHCP address over a network. The first NIC 102 is also configured to communicatively couple to the computing device 130. For example, the first NIC can include an Ethernet port, to which the computing device 130 can couple using an Ethernet cable. In some implementations, the first NIC 102 receives power (e.g., through a power over Ethernet (POE) network switch). The first NIC 102 is further configured to establish a VPN connection to which the computing device 130 can connect.

The microcontroller attachment 110 further includes a power output 106 and a power input 108. The power input 108 can be an electrical connection through which the microcontroller attachment 110 can receive electrical power. The power input 108 can receive an electrical current e.g., through a power cable that connects to the power input. In some examples, the power input 108 is a 48 V DC power input. For instance, the power input 108 can receive electrical power from a power grid. In an alternative embodiment, the power input 108 can receive electrical power from the microcontroller 120.

The power output 106 can be used to output electrical power (e.g., by connecting a current carrying wire to the power output). The power output 106 can output an electrical current (e.g., a direct current (DC)). For example, the power output 106 can be a 12 V DC power output. The power output 106 can be used, for instance, to provide output power to at least one of the computing device 130 and the microcontroller 120. In some implementations, the power output 106 is omitted from the microcontroller attachment 110, such as in instances where output power can be provided by other sources (e.g., the microcontroller 120, the power grid, etc.).

The microcontroller attachment 110 also includes a second NIC 104, which is configured to supply a DHCP address (e.g., a DHCP address received from the first NIC 102) to the computing device 130. For example, the first NIC 102 and the second NIC 104 can be communicatively coupled by an Ethernet cable. As another example, the second NIC 104 receives a second DHCP address from a second DHCP server (not shown) running on or communicatively coupled to the microcontroller 120. The second NIC 104 can send the second DHCP address to the computing device 130. In some implementations, the microcontroller 120 includes a microcontroller NIC (not shown) that can run its own DHCP server and retrieve a DHCP address from said DHCP server. The microcontroller 120 can send the DHCP address to the computing device 130 or to the microcontroller attachment 110, which can send the DHCP address to the computing device.

In some implementations, the second NIC 104 receives power from the first NIC 102 (e.g., through POE). While not shown in the example microcontroller system 100A of FIG. 1A, in some implementations, the second NIC 104 is communicatively coupled to the computing device 130 (e.g., through an Ethernet cable). In some implementations, the second NIC 104 is configured to supply power (e.g., power received from the first NIC 102) to the computing device 130 using POE.

The microcontroller system 100A can be used to establish a VPN connection for a computing device 130 using the following exemplary steps. In one step, the microcontroller attachment 110 is configured for connecting to a VPN. For example, the manufacturer can preconfigure the microcontroller attachment 110 by loading information related to the VPN client onto a memory of the microcontroller attachment 110 (not shown). This can allow the VPN client to sync and/or log into a VPN concentrator maintained by a remote host such as a cloud service provider. Syncing and/or logging into the VPN concentrator can facilitate access to the cloud service provider by the computing device 130.

In another step, the microcontroller attachment 110 can be communicatively coupled to a network 150. In some implementations, one or more of the first NIC 102 and the second NIC 104 is communicatively coupled to the network 150. For example, an Ethernet cable can be used to connect the first NIC 102 and/or the second NIC 104 to a modem to establish a network connection. The microcontroller attachment 110 can then establish a connection to a VPN router. Data can be transferred between the first NIC 102 and the second NIC 104 and between the first and second NICs and the VPN router.

Once connected to the VPN, the microcontroller attachment 110 can establish a secure connection to a remote server 160 using the first NIC 102 and the VPN connection. The microcontroller attachment 110 can include an LED that is illuminated to indicate that the secure connection to the remote server 160 was established. In general, the remote server 160 can be any server to which a user wants to connect their computing device 130 (which is communicatively coupled to the microcontroller attachment 110 through the first NIC 102). Therefore, the type of server can vary depending on the computing device to be connected. For example, the server 160 can be a network video recorder (NVR) server, a voice over internet protocol (VoIP) server, or a virtual entry server, to name a few examples. The computing device 130 can be any electronic device that can connect to a network. For example, the computing device 130 can be a camera, a phone, a printer, a laptop, or a virtual entry subsystem, as described in greater detail below.

In another step, a user can connect the computing device 130 to the microcontroller attachment 110. For example, an Ethernet cable can be used to connect the computing device 130 to the first NIC 102 of the microcontroller attachment 110. Once connected, the computing device 130 can connect to the VPN and use the secure connection established by the microcontroller attachment 110 to connect to the remote server 160. Therefore, by connecting the computing device 130 to the VPN, it can access cloud and remote services provided by the remote server 160. For instance, in some implementations, a user can connect to a webpage using the computing device 130 (or a mobile device communicatively coupled to the computing device 130) to establish certain network configurations. For example, the network configurations can include the static IP for the first NIC 102, the hostname, and a DHCP network range for the second NIC 104. In some implementations, the first NIC 102 is configured to have a static IP (e.g., instead of retrieving an IP address via the DHCP server).

The foregoing description is directed to a microcontroller attachment 110 configured to be communicatively (and optionally physically) coupled to the microcontroller for connecting a computing device to a VPN. However, in some implementations, as noted above, an integrated microcontroller device can include one or more components of the microcontroller attachment 110 and the microcontroller 120, and the integrated microcontroller device can be configured to perform one or more functions that can be performed by the combination of the microcontroller attachment and the microcontroller.

Figure 1B:
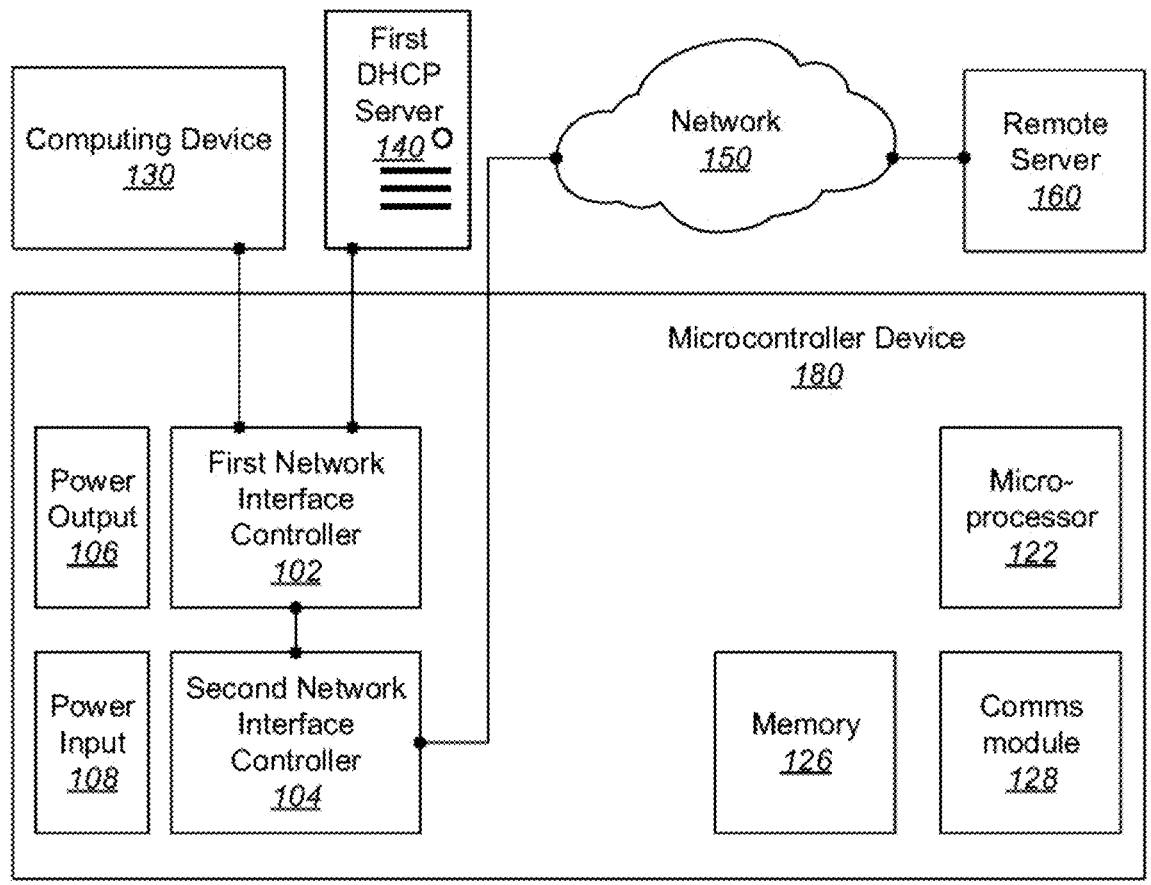
FIG. 1B is a block diagram of a microcontroller device.

FIG. 1B depicts a block diagram of an exemplary embodiment of an integrated microcontroller device 180. In general, the microcontroller device 180 includes some or all of the components of the microcontroller attachment 110 and the microcontroller 120 described above. In that regard, the microcontroller device 180 includes the first NIC 102, the second NIC 104, the power input 108, and the optional power output 106 of the microcontroller attachment 110. Moreover, the microcontroller device 180 includes the microprocessor 122, the memory 126, and the communications module 128 of the microcontroller 120.

Like the microcontroller attachment 110, the microcontroller device 180 is communicatively coupled to the computing device 130 and the first DHCP server 140 through the first NIC 102. Moreover, the microcontroller device 180 is communicatively coupled to the remote server 160 through the network 150 via the interface of the second NIC 104.

With this integrated architecture, the microcontroller device 180 can establish a VPN connection in substantially the same manner described above with respect to the microcontroller attachment 110.

Based on the foregoing, it can be appreciated that the microcontroller attachment 110 and microcontroller 120 may be configured as an integrated microcontroller device as described herein without departing from the scope of the present disclosure. Such an integrated microcontroller device may be developed, for instance, as an original equipment manufacturer (OEM) device specific for an intended application, such as the virtual entry system described below. Comparatively, the microcontroller attachment 110 may be designed as a specific add-on for use with existing, commercially available microcontrollers.

As noted above, in one application, the exemplary microcontroller device may be used in an entry subsystem of a virtual entry system. A "virtual entry system" can be understood to facilitate entry to a building (or other secured space) without requiring a human to physically unlock a door or other secured entry point of the building. Such virtual entry systems can include entry subsystems that can receive commands from a remote server, such as a virtual entry server communicatively coupled to the entry subsystem over a network. For example, the commands received by the entry subsystem can include a command directed to unlocking a door of a building.

Figure 2:
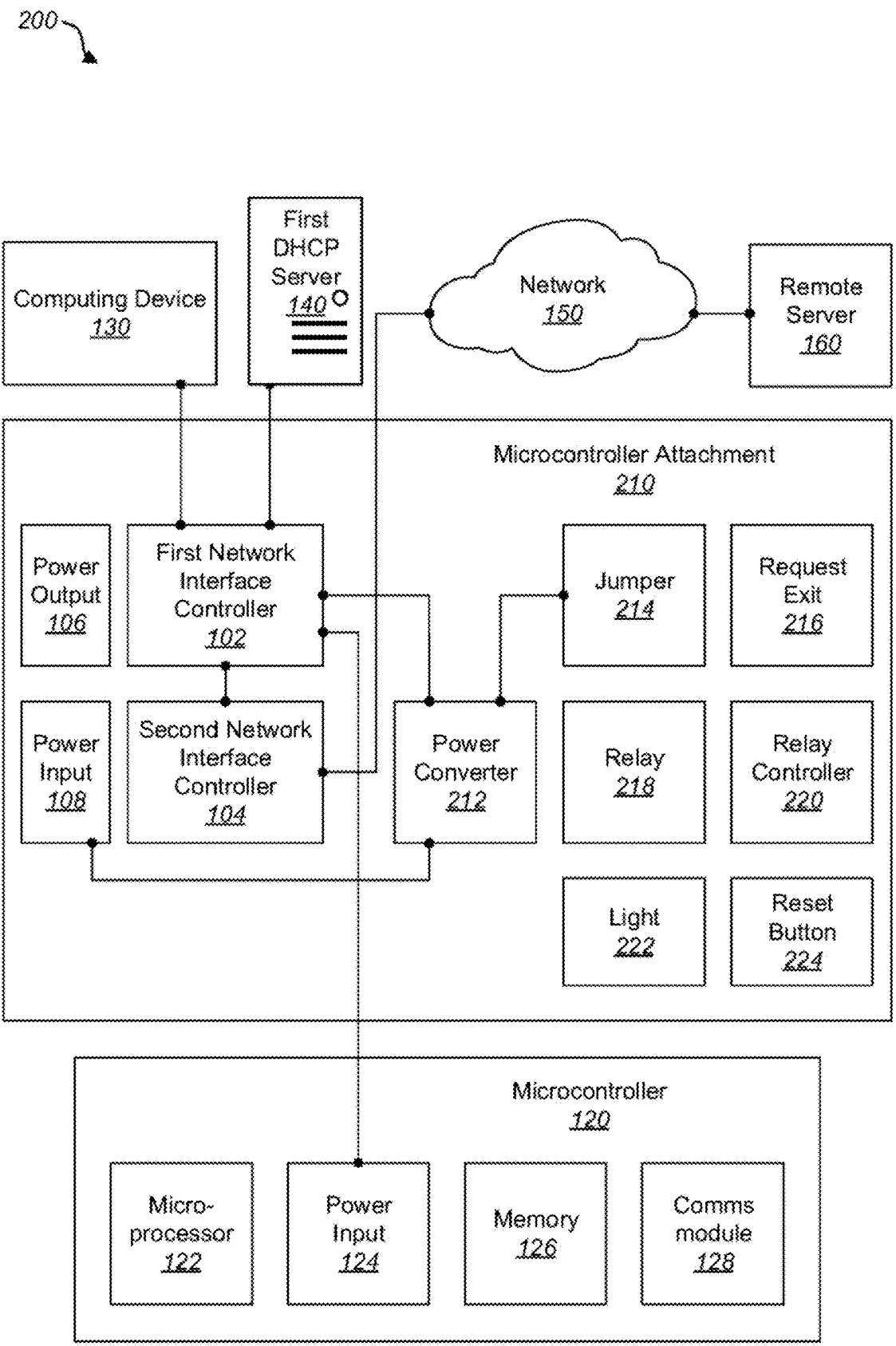
FIG. 2 is a block diagram of another microcontroller system that includes a microcontroller attachment communicatively coupled to the microcontroller of FIG. 1A.

FIG. 2 is a block diagram of an alternative embodiment of a microcontroller system 200 for use in an entry subsystem of a virtual entry system. In the depicted exemplary embodiment, the microcontroller system 200 has a microcontroller attachment 210 communicatively coupled to the microcontroller 120. Like the microcontroller attachment 110, the microcontroller attachment 210 includes the first NIC 102, the second NIC 104, the power output 106, and the power input 108. The microcontroller attachment 210 additionally includes components that facilitate the use of the microcontroller attachment 210 as a component in an entry subsystem for a virtual entry system.

For instance, in one aspect, the microcontroller attachment 210 can include a request exit button 216, which can be used to manually request that a lock be unlocked (e.g., a lock to which the entry subsystem is communicatively coupled to).

The microcontroller attachment 210 may also include a power converter 212, which can be electrically coupled to the power input 108, the first NIC 102, and a jumper 214. For example, the power converter 212 can be a buck converter, such as a stepdown buck converter. The power input 108 can power the power converter 212, which can receive power through a power over Ethernet (POE) connection to the first NIC 102. For example, the power converter 212 can be used to convert the power received from the first NIC 102 to 12 V DC. The power converter can also supply a current to the jumper 214 (e.g., 500 mA or more, 1 A or more).

The jumper 214 can also be used to supply power to a relay 218. Tripping relay 218 (e.g., changing a state of the relay such that a current through a wire connected to the relay is either started or stopped) causes a lock to which the microcontroller attachment 210 is connected to be locked or unlocked. For example, pressing the request exit button 216 can unlock a lock by tripping relay 218.

The microcontroller attachment 210 can also include a relay controller 220, which can adjust the amount of time that the relay 218 remains tripped, therefore adjusting the amount of time that the lock remains unlocked. For example, the relay controller 220 can be a potentiometer. The amount of time that the relay 218 remains tripped can be in the interval of 3 seconds to 1 minute (e.g., 5 seconds or more, 10 seconds or more, 20 seconds or more).

In the example of FIG. 2, the microcontroller attachment 210 includes a light 222. For example, the light 222 can be an LED. As described above, the microcontroller attachment 210 can establish a VPN connection. In some implementations, the microcontroller attachment 210 can activate the light 222 to indicate that the VPN connection has been successfully established. In other implementations, the microcontroller attachment 210 can activate the light 222 to illuminate an area surrounding the microcontroller attachment. In still other implementations, the light 222 is omitted from the microcontroller attachment 210.

The microcontroller attachment 210 may further include a reset button 224. In some implementations, the reset button 224 is used to reset the connection of the microcontroller attachment 210 to the remote server 160, a VPN, or another network.

Figure 3:
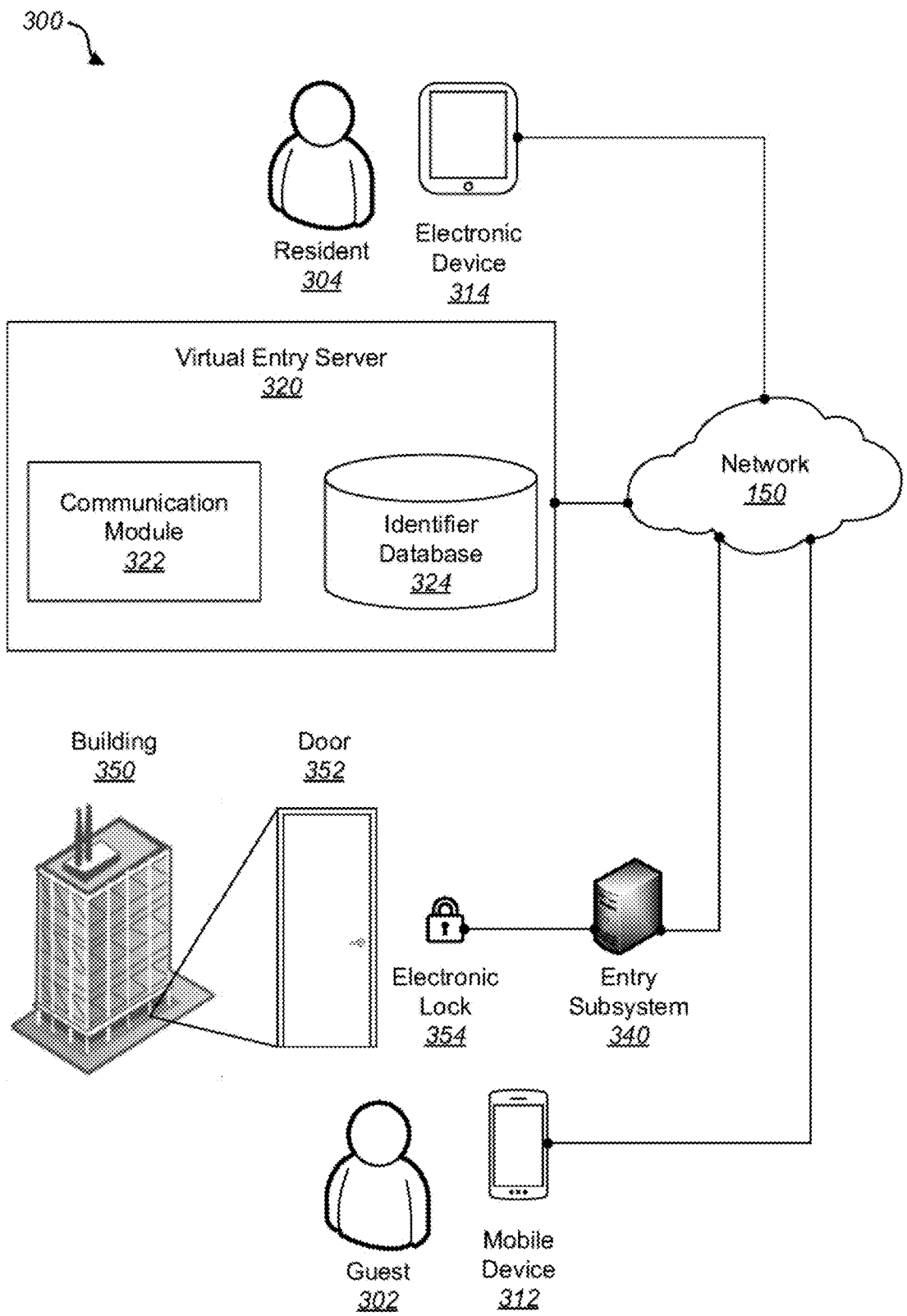
FIG. 3, a block diagram of a virtual entry system that includes a virtual entry server communicatively coupled to an entry subsystem.

FIG. 3 depicts a block diagram of an exemplary embodiment of a virtual entry system 300. In the depicted exemplary embodiment, the virtual entry system 300 includes a virtual entry server 320 communicatively coupled to an entry subsystem 340 through a network 150. The entry subsystem 340 is communicatively coupled to the network 150 through the microcontroller system 200. It should be appreciated that the microcontroller system 100A and/or the microcontroller device 180 described above may instead be used to define at least a portion of the entry subsystem 340.

The network 150 can be any kind of network capable of enabling communication between the various components of FIGS. 1A, 1B, 2, and 3 (e.g., between the microcontroller attachment 110 or 210 and the remote server 160, between the microcontroller device 180 and the remote server 160, and between the mobile device 312, the electronic device 314, the virtual entry server 320, and the entry subsystem 340). For example, the network can be a WiFi network.

A mobile device 312 of the guest 302 and an electronic device 314 of a resident 304 are connected to the network 150. The mobile device 312 can be any mobile electronic device that is capable of sending and receiving information over a network. For example, the mobile device 312 can be a smartphone, a wearable electronic device, or a tablet computer. The electronic device 314 can be any electronic device that is capable of participating in a communication session. For example, the electronic device 314 can be a smartphone, a landline, a wearable electronic device, a tablet computer, or another electronic device that includes a telephone service application (e.g., a plain old telephone service (POTS) application), a softphone application, a voice over internet protocol (VoIP) application, or video-chat application. In other examples, the electronic device 314 is a device that is housed in the building 350. For example, the electronic device 314 can be an electronic kiosk or smart home system.

The virtual entry server 320 includes a communication module 322 and an identifier database 324. The identifier database 324 maintains one or more identifiers that are specific to names and/or unit numbers of residents of buildings, such as the resident 304 of the building 350. The communication module is configured to facilitate a communication session between the mobile device 312 and the electronic device 314, as described in greater detail below with respect to FIG. 4.

The entry subsystem 340 is communicatively coupled to an electronic lock 354 (which defines a computing device) on a door 352 of a building 350 (or other secured space) through the first NIC 102 or the second NIC 104. The entry subsystem 340 may be located within a certain distance of the electronic lock 354 such that the entry subsystem 340 can communicate with the lock 354. In that regard, the entry subsystem 340 can communicate with the lock 354 through a wireless connection such as Bluetooth or through a wired connection such as a cable attached between the entry subsystem and the lock.

The electronic lock 354 is configured to be selectively locked and unlocked by the entry subsystem 340 (e.g., tripping relay 218 to lock or unlock the electronic lock 354, as described above with respect to FIG. 2). The electronic lock 354 can be any electronic lock suitable for communicative coupling to the entry subsystem 340.

In some implementations, the entry subsystem 340 includes a card reader such as a proximity card reader (not shown) which the resident 314 can use to unlock the electronic lock 354. For example, when the resident 314 places a proximity card on or near the proximity card reader of the entry subsystem 340, the proximity card reader can determine whether the proximity card is a valid key for unlocking the electronic lock 354. If the proximity card reader determines that the proximity card is valid, then the entry subsystem 340 sends instructions to the electronic lock 354 to unlock the door 352.

Certain components of the virtual entry system 300 can replace conventional building call box systems. For example, the entry subsystem 340 is configured to communicate over the network 150 with the virtual entry server 320 to allow the guest 302, who is within proximity of the entry subsystem 340, to communicate with the resident 304 of the building 350. If the resident 304 wants to allow the guest 302 to enter the building 350, the resident can use the electronic device 314 to communicate a request to unlock the electronic lock 354 using a signal sent to the electronic lock by the entry subsystem 340.

Figure 4:
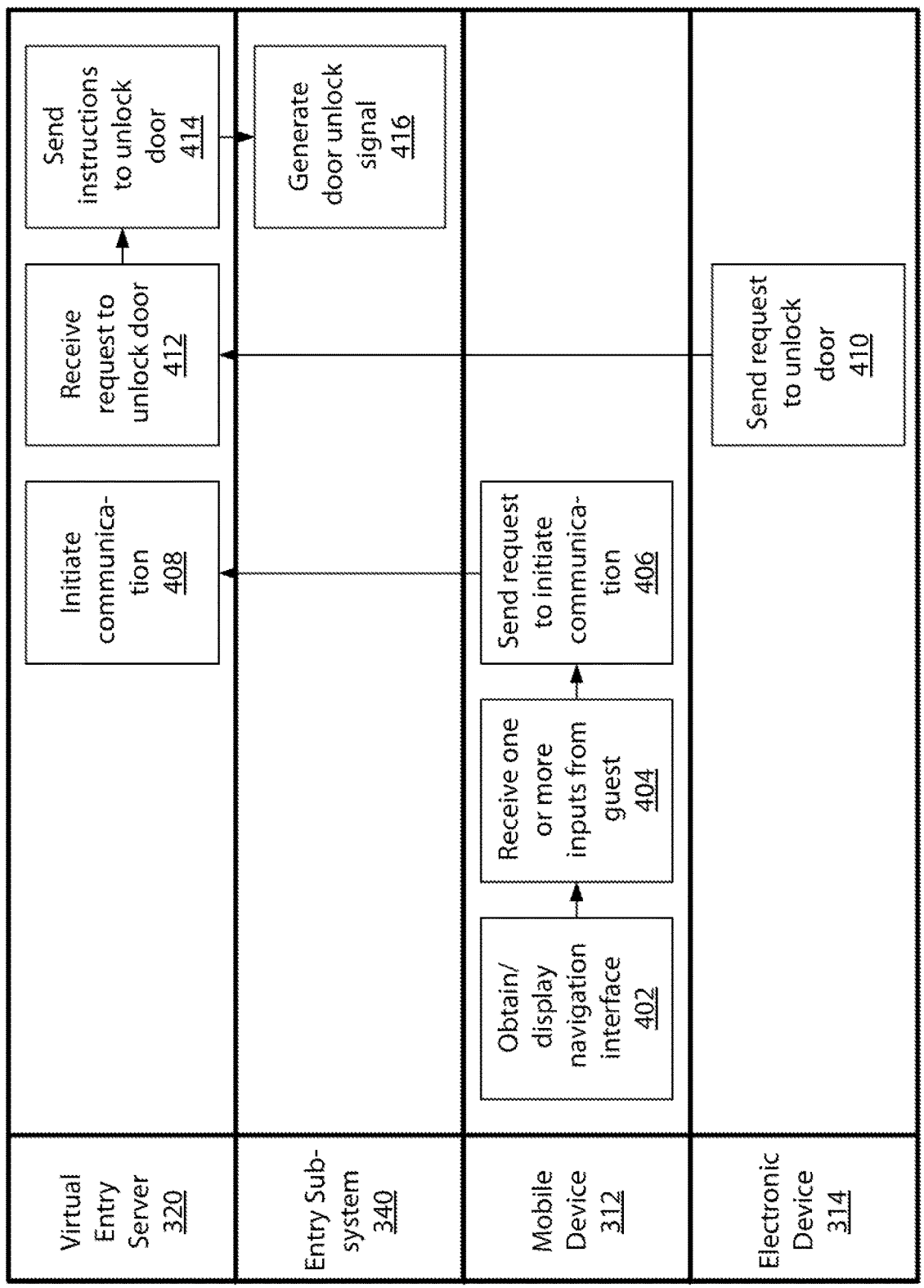
FIG. 4 is a swim lane diagram illustrating actions performed by the components of the virtual entry system of FIG. 3.

FIG. 4 is a swim lane diagram illustrating actions performed by components of the virtual entry system 300. At stage 402, the mobile device 312 of the guest 302 obtains and displays a navigation interface. Stage 402 may occur, for example, when the guest 302 is within a certain distance of the entry subsystem 340, such as when the guest 302 walks up to the door 352 of the building 350.

When the mobile device 312 is within a certain distance to the entry subsystem 340, the entry subsystem can detect the mobile device and send the device information, such as the navigation interface. In some implementations, the entry subsystem 340 can detect the mobile device 312 and send information to the mobile device using near-field communication (NFC), Bluetooth, or beacon technology. For example, the communications module 128 can enable communication using NFC, Bluetooth, or beacon technology. In other implementations, a device other than the entry subsystem 340 can detect the mobile device and/or send information, such as the information related to the navigation homepage, to the mobile device. In some implementations, the information related to the navigation interface is sent in response to detecting the mobile device using the above methods of detection. In some implementations, the entry subsystem 340 can store the information locally on a memory unit (e.g., the memory 126). In other implementations, the entry subsystem 340 can retrieve the information over a network prior to sending the information to the mobile device 312.

In some implementations, an application of the mobile device 312 can determine the device's location. For example, the application can include or perform location based services. As another example, the application can be one that runs in the background of the mobile device 312 and collects geographic location information associated with the device (e.g., using GPS data). If the location of the mobile device 312 is within a certain distance of the entry subsystem 340, the building 350, the door 352, or the lock 354, then the application can display a notification on the mobile device. For example, the notification can include a welcome message that includes identifying information about the building 350. As another example, the notification can include a selectable option to view information related to the navigation interface. The information related to the navigation interface can be received by the mobile device 312 over a network (e.g., a mobile network of the mobile device).

In some implementations, the guest 302 may use the mobile device 312 to scan a code (e.g., a barcode or QR code) that is printed on or near the electronic lock 354 or the door 352, wherein scanning the code causes the mobile device 312 to display a webpage that includes the information, such as the navigation interface. Detecting the mobile device 312 is advantageous because it allows the entry subsystem 340 to verify that the guest 302 is physically present within a certain proximity to the entry subsystem. Such a verification can prevent entities that are not within a certain proximity to the entry subsystem 340 (e.g., not near the building 350) from attempting to initiate a communication session or attempting to request that the door 352 be unlocked when they are not close enough to enter the building.

The navigation interface can include information that identifies the building 350 and presents one or more selectable options using the mobile device 312. For example, one of the selectable options can prompt a user to enter an access code to enter the building. For example, the navigation homepage can display a message such as "Enter access code". After the guest 302 selects the option to enter an access code, the navigation interface can display a prompt, allowing the user to enter an access code using the mobile device 312.

As another example, one of the selectable options can prompt a guest to enter or select a resident's name to initiate a communication session with the resident. For example, the navigation homepage can display an editable textbox, with which the guest 302 can enter the name of a resident.

As another example, the navigation homepage can display a directory of one or more residents of the building 350, and the guest 302 can navigate through the directory to find the name of a particular resident. Once the guest 302 has found the name of the particular resident, the guest can select the name.

As another example, one of the selectable options can prompt a guest to enter or navigate to a resident's unit number to initiate a communication session with the resident. For example, the navigation homepage can display an editable textbox, with which the guest 302 can enter the unit number of a resident.

As another example, the navigation homepage can display a directory of one or more unit numbers of the building 350, and the guest 302 can navigate through the directory to find the unit number of a particular resident. Once the guest 302 has found the unit number of the particular resident, the guest can select the unit number.

As another example, one of the selectable options can initiate a communication session with a particular entity, such as a front desk or leasing office for the building 350. For example, the navigation homepage can display a message such as "Call front desk" or "Call leasing office". Selecting the option to initiate a communication session with the particular entity can result in the mobile device 312 initiating a communication session with the entity.

As another example, one of the selectable options can be to request the virtual entry server issue a one-time virtual credential to gain access to the building 350. For example, the virtual entry server can issue a one-time virtual credential, and the communication interface can prompt the guest 302 to sync the mobile device 312 with the entry subsystem 340 (e.g., to confirm that the guest is present at the building 350). Syncing the mobile device 312 with the entry subsystem 340 can include scanning, using the mobile device, a code (e.g., a barcode or QR code) that is printed on or near the electronic lock 354 or the door 352, etc. Notification of the code being scanned can be sent to the virtual entry server 320 (e.g., over a network). Once the mobile device 312 is synced, the virtual entry server 320 can generate a door unlock signal and send the door unlock signal to the electronic lock 354. In response to sending the door unlock signal, the virtual entry server 320 can prevent the one-time virtual credential from being used to gain access to the building 350, such that the guest 302 would have to request another one-time virtual credential to gain access to the building using this option.

At stage 404, the mobile device 312 receives one or more inputs from the guest 302. For example, a first input can correspond to selecting the option to enter a building code, and a second input may correspond to entering the building code. As another example, a first input can correspond to selecting or navigating to a resident's name, and a second input can correspond to entering or selecting a resident's name. As another example, a first input can correspond to selecting or navigating to a resident's unit number, and a second input can correspond to entering or selecting a resident's unit number. As yet another example, the input can correspond to selecting the option to initiate a communication session with a particular entity.

If the mobile device 312 receives an input corresponding to entering a building code, then the mobile device can send the building code to the virtual entry server 320 for validation. The virtual entry server 320 validates the code. If the validation is successful (e.g., if the virtual entry server 320 determines that the building code is a valid code that can be used to enter the building 350), then the virtual entry server can send instructions to unlock the door 352, as described in greater detail with respect to stage 414. If the validation is not successful (e.g., if the virtual entry server 320 determines that the building code is not a valid code that can be used to enter the building 350), then the virtual entry server does not send instructions to unlock the door 352. Instead, the virtual entry server may send a message to the mobile device 312 indicating that the validation was not successful.

At stage 406, the mobile device 312 sends a request to initiate a communication session. For example, if the input received in stage 404 corresponds to a selection of a resident's name or unit number, or corresponds to the selection of the option to initiate a communication session with the particular entity, the mobile device can communicate this selection by sending a request to initiate a communication session to the virtual entry server 320. The request to initiate the communication session can include an indication of the one or more inputs received at stage 404, so that the virtual entry server receives information indicating with which entity the communication session should be initiated. For example, the request to initiate the communication session can include a particular identifier for the resident, unit, or other entity of the building 350. Upon receiving the particular identifier for the resident, unit, or other entity of the building 350, the virtual entry server 320 can use the identifier database 324 to determine information, related to the identifier, to use to initiate the communication session.

At stage 408, the virtual entry server 320 initiates the communication session. For example, the virtual entry server 320 receives the request to initiate the communication session and determines, from the request, with which resident or entity to initiate the communication session. The communication session can be a telephone call or a video-chat or VoIP communication session that is hosted by the communication module 322 of the virtual entry server 320, to name a few examples.

After the virtual entry server 320 has determined the parties with which to initiate the communication session, the server sends information corresponding to a communication interface to the mobile device 312. For example, the information corresponding to a communication interface can include a meeting code that the mobile device 312 can use to connect to a corresponding communication session. More particularly, the communication module 322 can generate the meeting code that corresponds to a communication session hosted by the communication module 322, wherein the communication session is between the mobile device 312 and another electronic device (e.g., an electronic device of a particular resident or an electronic device or telephone of an entity such as a front desk or leasing office of the building 350).

When the mobile device 312 receives the information corresponding to the communication interface, the receipt of the information can cause the mobile device to launch a certain application of the mobile device. For example, the application can be a video-chat or VoIP application installed on the mobile device. As another example, the receipt of the information can cause the mobile device to launch a certain web application on the mobile device 312, such as a web communication application corresponding to a video-chat or VoIP application. In some implementations, the web application can be hosted by the virtual entry server 320 (e.g., the communication module 322 of the virtual entry server).

In some implementations, receipt of the information corresponding to the communication interface can cause the mobile device 312 to display the meeting code. The meeting code can be selectable, and selection of the meeting code can cause the mobile device 312 to open a communication application such as a local or web video-chat or VoIP application. The communication application can send the meeting code to the virtual entry server 322 over a network, e.g., the network 150. The virtual entry server 320 (e.g., the communication module 322 of the virtual entry server) can use the received meeting code to determine that the guest 302 has confirmed that the communication session is to be initiated.

The communication module 322 hosts the communication session, allowing the mobile device 312 to communicate using the communication application. In the example of FIG. 4, the communication module 322 hosts a communication session between the mobile device 312 of the guest 302 and the electronic device 314 of the resident 304. Accordingly, the communication module 322 can send a notification to the electronic device 314, the notification indicating that a request to communicate with the resident 304 was sent to the communication module 322. In some implementations, the notification can include identifying information of the guest 302, such as the guest's name, which can be provided by the guest using the mobile device 312.

In some implementations, instead of participating in a video-chat or VoIP communication session, as described above, the guest 302 and the resident 304 can communicate through a telephone call. For example, the communication interface can prompt the guest 302 to open their default telephone calling application on the mobile device 312 and dial a phone number sent to the mobile device 312 by the virtual entry server 320 (e.g., sent by the communication module 322 of the virtual entry server 320).

In some implementations, the virtual entry system 320 (e.g., the communication module 322 of the virtual entry system) places a call to a phone (e.g., a POTS phone or a VoIP phone) in response to the guest 302 selecting a name or unit number of a resident they want to communicate with. For example, the virtual entry system 320 can use a phone number associated with the phone to place the call. The phone can be connected to a cloud server (e.g., a cloud communication service). For example, the phone can be connected to the cloud server through a VPN connection established by the entry subsystem 340 or through standard port forwarding that may forward data through a firewall. In some implementations, the phone receives a call from the cloud server and, in response to receiving the call from the cloud server, attempts to initiate a communication session with the resident 304 (e.g., with the electronic device 314 of the resident 304).

If the input received in stage 404 corresponds to a selection of a resident's name or unit number, the mobile device can communicate this selection to the virtual entry server 320. As a security feature, if the virtual entry server 320 receives a call when there has not been a selection of a resident's name or unit number to warrant a call to the virtual entry server, then the server can determine that the call is not a valid call. The virtual entry server 320 can decline calls that it determines are not valid calls.

The resident 304 can choose to accept or deny the request to communicate. If the resident 304 denies the request to communicate using the electronic device 314, then the electronic device 314 can send information indicative of this to the virtual entry server 320, which can communicate to the mobile device 312 that the resident 304 denied the request to communicate.

If instead the resident 304 accepts the request to communicate using the electronic device 314, then the virtual entry server 320 (e.g., the communication module 322 of the virtual entry server 320) initiates a communication session between the mobile device 312 and the electronic device 314, and the resident 304 is able to communicate with the guest 302. For example, accepting the request to communicate using the electronic device 314 can cause the electronic device to open a communication application such as a local or web video-chat or VoIP application. The resident 304 can then use the communication application to communicate with the guest 302 over the network 150. The communication application used by the guest 302 and the resident 304 can display a communication interface using the mobile device 312 and electronic device 314, respectively.

In some implementations, when the communication session is a video chat, the video chat can be one or two-directional. An example of a two-directional video chat is one in which both parties can at least see each other using the video chat application. An example of a one-directional video chat is one in which only one party (e.g., the resident 304) can see the other party (e.g., the guest 302), while both parties can hear each other.

Hosting, by the communication module 322, a communication session between the guest 302 and the resident 304 provides an opportunity for the resident 304 to communicate with the guest 302 prior to allowing the guest 302 to enter the building 350. For example, if the guest 302 is a delivery person who is at the building 350 to deliver a package for the resident 304, the guest can convey this information to the resident, who can then decide whether or not to allow the guest to enter the building 350.

In the example of FIG. 4, the resident 304 decides to allow the guest 302 to enter the building 350. The resident 304 can indicate this decision using the electronic device 304, e.g., using the communication interface of the electronic device. For example, the communication interface of the electronic device 304 can include a "door unlock" button.

At stage 410, the electronic device 314 sends a request to unlock the door 352. For example, the electronic device 314 can send the request to unlock the door 352 to the virtual entry server 320 in response to receiving an input from the resident 304 indicating the same. In some implementations, the resident 304 indicates the decision to allow the guest 302 to enter the building 350 by entering a door access code to a communication interface of the electronic device 314. For example, the communication interface can register the input of the door access code and communicate the access code to the virtual entry server 320.

At stage 412, the virtual entry server 320 receives the request to unlock the door 352 and at stage 414, the virtual entry server 320 sends, to the entry subsystem 340, an instruction to unlock the door 352.

At stage 416, the virtual entry server 320 generates a door unlock signal in response to receiving the instruction to unlock the door 352 and sends the door unlock signal to the electronic lock 354. In response to receiving the door unlock signal, the electronic lock 354 unlocks the door 352 (e.g., by tripping relay 218). Whereas the door 352 was locked prior to the electronic lock 354 receiving the door unlock signal, when the door 352 is unlocked, the guest 302 is able to open the door and enter the building 350.

Figure 5:
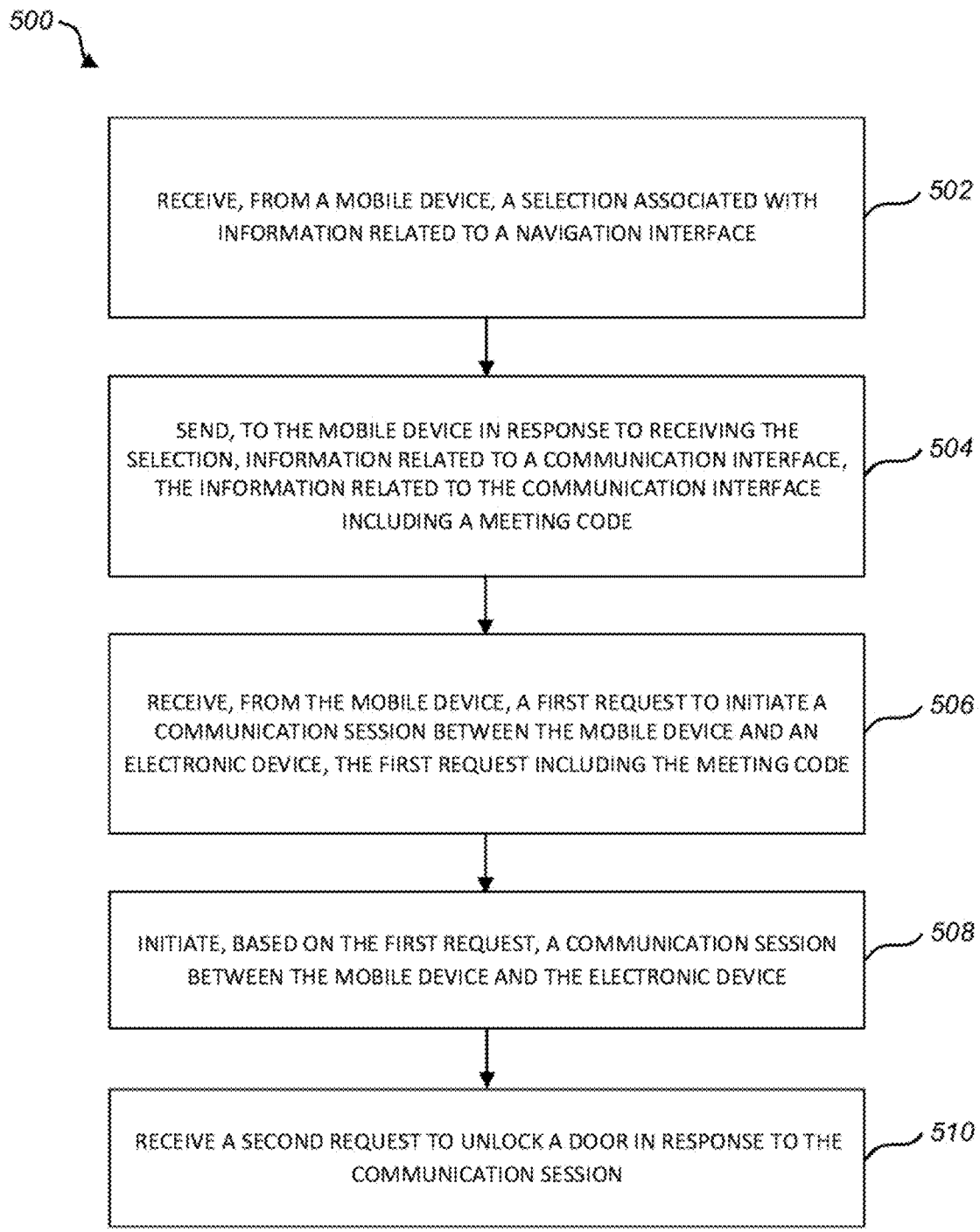
FIG. 5 is a flow diagram illustrating an example of a process for operating a virtual entry system for a building.

FIG. 5 is a flow diagram illustrating an example of a process 500 for operating a virtual entry system for a building. The process 500 is described as being performed by a virtual entry server. For example, the virtual entry server 320, can perform the process 500.

At operation 502, the virtual entry server receives, from a mobile device, a selection associated with information related to a navigation interface. For example, the navigation interface can display, on the mobile device, selectable options such as an option to enter a building access code, an option to enter or navigate to a resident's name to initiate a communication session with the resident, an option to enter or navigate to a resident's unit number to initiate a communication session with the resident, or an option to initiate a communication session with a particular entity such as a front desk or leasing office of the building. The selection associated with the information related to the navigation interface can include a selection of one of the options and information input to the mobile device, such as a building code, or the name or unit number of a resident.

In some implementations, the virtual entry server can send the mobile device the information related to the navigation interface. For example, the virtual entry server can send the information related to the navigation interface to an entry subsystem communicatively coupled to an electronic lock of a door of the building, and the entry subsystem can send the information related to the navigation interface to the mobile device. In other implementations, the mobile device can retrieve the information related to the navigation interface from a website hosted by the virtual entry server.

In some implementations, the navigation interface can include a selectable option to initiate an automated attendant system that dictates at least a portion of the information related to the navigation interface. For example, a guest can select the option to initiate the automated attendant system, which the guest can use to hear a directory of names of residents of a building or unit numbers corresponding to the residents. The navigation interface can provide an option for a guest to select a name or unit number by providing an input to the mobile device (e.g., by pressing a button or number on a keypad corresponding to the guest's selection). Therefore, a guest that is visually impaired can use the navigation interface to select a resident with which to communicate. In some implementations, the navigation interface can include an option to initiate a communication session between the mobile device 312 and an attendant that can assist the guest with the selection of a name or unit number.

In some implementations, the virtual entry server performs a location verification process for the guest. For example, the location verification process can include verifying, by the virtual entry server, the location of the guest (e.g., using GPS data received from a mobile device of the guest or other location data from an application of the mobile device). As another example the location verification process can including prompting, by the virtual entry server, the guest to enter their location. The location verification process can be performed prior to initiating a communication session between the mobile device and electronic device. For example, the location verification process can be performed to ensure that the guest is at the location at which they say they are. In some implementations, the information related to the navigation interface is sent to the mobile device in response to a successful verification that the guest is within a certain distance of the building.

In some implementations, part of the location verification process can include prompting the guest to enter (e.g., using the mobile device of the guest) a building code that is unique to a certain building. For example, a property manager can place the building code so that it is visible to a guest (e.g., by placing the building code by an entrance of the building). The virtual entry server may send the mobile device information related to the navigation interface in response to receiving an indication that the guest entered the building code corresponding to the building. The guest may be given a predetermined number of tries to enter the building code, and if the correct code is not entered in the predetermined number of tries, the virtual entry server may block the mobile device from being sent the information related to the navigation interface or from initiating a communication session. For example, the virtual entry server can block the UMEI, MAC, or IP address of the mobile device.

At operation 504, the virtual entry server sends, to the mobile device in response to receiving the selection, information related to a communication interface, the information related to the communication interface including a meeting code. For example, if the selection received at operation 502 includes the name or unit number of a resident, then the virtual entry server can send the mobile device information related to a communication interface. For example, when received by the mobile device, the information can cause a communication interface for a web application corresponding to a communication application to be displayed on the mobile device.

The communication interface displayed on the mobile device can also display a meeting code. The meeting code can be a code specific to a communication session to be initiated between the mobile device and another device, such as an electronic device of a resident, front desk, or leasing office. That is, the virtual entry server can use the meeting code to determine the parties that may participate in the communication session.

In some implementations, the virtual entry server generates the meeting code to initiate a communication session that it hosts. For example, the virtual entry server can include a communication module configured to host a communication session. In other implementations, the virtual entry server does not host the communication session and instead the virtual entry server is communicatively coupled to a third-party communication server (e.g., a communication server maintained by a third-party video-chat or VoIP communication service). The third-party communication server can generate the meeting code and send the meeting code to the virtual entry server. An advantage of hosting the communication session using a communication module or third-party communication server is that the guest 302 need not reveal a phone number associated with the mobile device 312, which provides confidentiality to the guest 302.

At operation 506, the virtual entry server receives, from the mobile device, a first request to initiate a communication session between the mobile device and an electronic device, the first request including the meeting code. For example, the virtual entry server can use the meeting code to determine that a communication session is to be hosted between the mobile device and the electronic device. After identifying the parties of the communication session, the virtual entry server can initiate a communication session between the mobile device and the electronic device (e.g., host the communication session using a communication module of the virtual entry server).

In some implementations in which the communication session is hosted by a third-party communication server, the virtual entry server can receive the first request to initiate the communication session, including the meeting code, and send the first request and/or meeting code to the third-party communication server, which can use the first request and/or meeting code to initiate the communication session (e.g., host the communication session between the mobile device and the electronic device).

At operation 508, the virtual entry server initiates, based on the first request, a communication session between the mobile device and the electronic device. For example, the communication module of the virtual entry server can host the communication session between the mobile device and the electronic device, allowing a guest using the mobile device and a resident using the electronic device to communicate. If instead a third-party communication server hosts the communication session, the virtual entry server can send a request to the third-party communication server to initiate the communication session between the mobile device and the electronic device.

In some implementations, the virtual entry server initiates the communication session in response to receiving the first request including the meeting code. For example, the virtual entry server can use the meeting code to determine which parties to participate in the communication session. In some implementations, the virtual entry server sends the meeting code to the third-party communication server, which can use the meeting code to initiate the communication session.

At operation 510, the virtual entry server receives a second request to unlock a door in response to the communication session. For example, during or after the communication session, the resident can send, using the electronic device, the second request to unlock the door of the building, and the virtual entry server can receive the second request from the electronic device.

In some implementations, instead of receiving the second request from the electronic device, the virtual entry server can receive the second request from an additional electronic device. For example, the additional electronic device can be an electronic security device that the resident has in their home (e.g., a smart home device). As another example, the additional electronic device can be a virtual assistant device, such as Amazon Alexa or Google Home device.

The virtual entry server can receive the second request, and in response to receiving the second request, the virtual entry server can send instructions to unlock the door of the building to a computing system. For example, the commuting system can be an entry subsystem communicatively coupled to an electronic lock attached to the door. The entry subsystem can perform operations to unlock the door by communicating with the electronic lock, as described in greater detail below with respect to FIG. 6.

Figure 6:
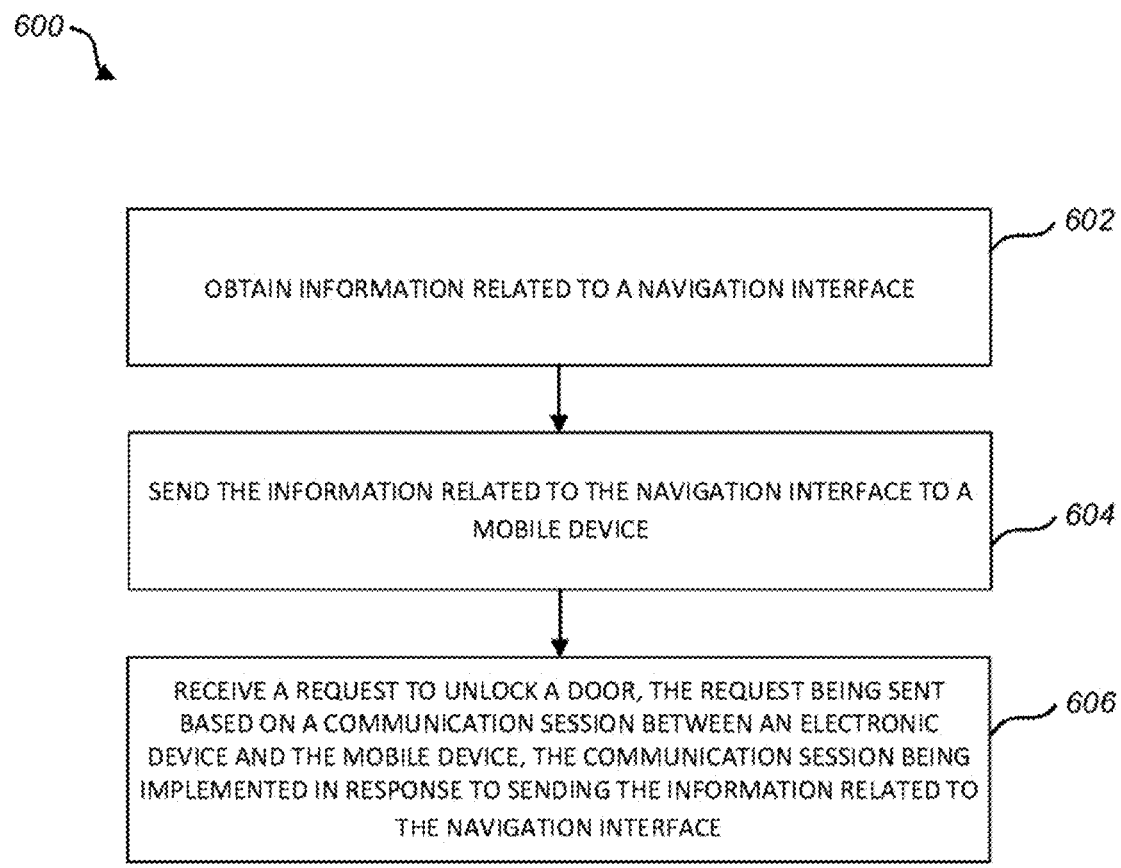
FIG. 6 is a flow diagram illustrating an example of a process for receiving a request to unlock a door.

FIG. 6 is a flow diagram illustrating an example of a process 600 for receiving a request to unlock a door. The process 600 is described as being performed by an entry subsystem of a virtual entry system. For example, the entry subsystem 340 of the virtual entry system can perform the process 600.

At operation 602, the entry subsystem obtains information related to a navigation interface. For example, the entry subsystem can obtain the information related to the navigation interface from a virtual entry server or from a website hosted by the virtual entry server. The information related to the navigation interface can include a URL of the navigation interface. The information related to the navigation interface can include information corresponding to a building at which the entry subsystem is located. The information related to the navigation interface is described in greater detail above with respect to FIGS. 4-5.

At operation 604, the entry subsystem sends the information related to the navigation interface to a mobile device. For example, the entry subsystem can send the information related to the navigation interface to a mobile device of a guest who is outside the building at which the entry subsystem is located (e.g., using NFC).

At operation 606, the entry subsystem receives a request to unlock a door, the request being sent based on a communication session between an electronic device and the mobile device, the communication session being implemented in response to sending the information related to the navigation interface. For example, the communication session can be between the mobile device of the guest and an electronic device of a resident of the building. The communication session allows the resident an opportunity to communicate with the guest, prior to deciding whether to let the guest into the building by requesting to unlock a door of the building. If the resident decides to let the guest into the building, the resident can input their request to the electronic device. In some implementations, the electronic device can send the request to unlock the door to the virtual entry server, which can send the request to the entry subsystem. In other implementations, the electronic device can send the request to unlock the door to the entry subsystem.

In some cases, at least a subset of the processes 500 and 600 illustrated by the flow diagrams of FIGS. 5-6 may be performed remotely by one or more network servers (e.g., of a cloud service). In some examples, the processes described herein (e.g., the message validation processes 500 and 600 and/or other processes described herein) may be performed by a computing device or apparatus.

Figure 7:
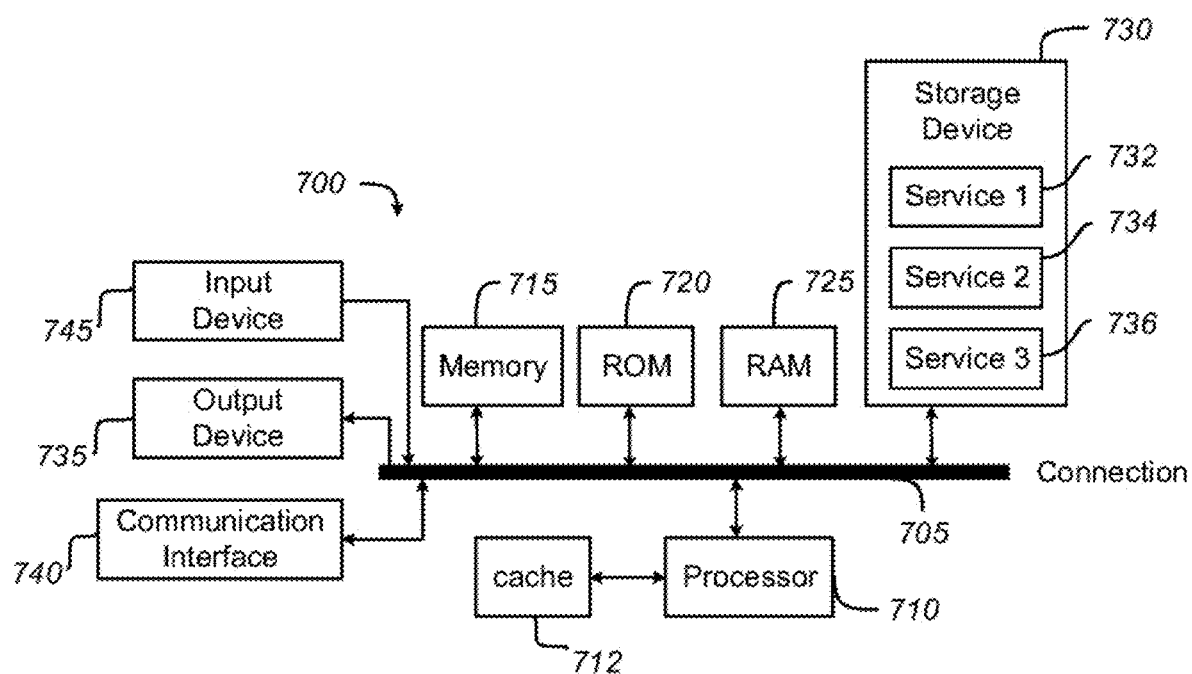
FIG. 7 is a diagram illustrating an example of a system for implementing certain aspects of the present technology.

At least a subset of the processes 500 and 600 illustrated by the flow diagrams of FIGS. 5-6 may be performed by a computing device with the architecture of the computing system 700 shown in FIG. 7. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 500 and 600.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams and flow diagrams of FIGS. 5-6 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams and flow diagrams of FIGS. 5-6 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700.

Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

LISTING OF EXEMPLARY INNOVATIONS

1. A method performed by a system of one or more computers for operating a virtual entry system for a building, the method comprising:
   receiving, from a mobile device, a selection associated with information related to a navigation interface;
   sending, to the mobile device in response to receiving the selection, information related to a communication interface, the information related to the communication interface including a meeting code;
   receiving, from the mobile device, a first request to initiate a communication session between the mobile device and an electronic device, the first request including the meeting code;
   initiating, based on the first request, a communication session between the mobile device and the electronic device; and
   receiving a second request to unlock a door of the building in response to the communication session.
2. The method of claim 1, further comprising sending to a computing system, instructions to unlock a door of the building in response to receiving the second request.
3. The method of claim 1, wherein the second request is received from the electronic device.
4. The method of claim 1, wherein the second request is received from an additional electronic device.
5. The method of claim 1, further comprising sending to the mobile device information related to the navigation interface.
6. The method of claim 1, wherein the information related to the navigation interface includes one or more names of residents of the building.
7. The method of claim 1, wherein the information related to the navigation interface includes one or more unit numbers associated with residents of the building.
8. The method of claim 1, wherein the information related to the navigation interface includes a selectable option to call a particular entity of the building.
9. The method of claim 8, wherein the particular entity of the building is a leasing office or a front desk of the office.
10. The method of claim 1, wherein the mobile device receives the information related to the navigation interface through near-field communication, Bluetooth, or beacon technology.
11. The method of claim 1, wherein the mobile device receives the information related to the navigation interface in response to scanning a barcode or QR code.
12. The method of claim 1, wherein the information related to the navigation interface includes a selectable option to initiate an automated attendant system that dictates at least a portion of the information related to the navigation interface.
13. The method of claim 12, wherein the portion of the information dictated by the automated attendant system includes one or more names of residents of the building.
14. The method of claim 12, wherein the portion of the information dictated by the automated attendant system includes one or more unit numbers associated with residents of the building.
15. The method of claim 1, further comprising:
   receiving, from the electronic device, a third request to generate a one-time credential for use in unlocking the door of the building;
   generating the one-time credential in response to receiving the third request;
   sending, to the mobile device, a request to sync the mobile device;
   receiving an indication that the mobile device has been synced; and
   sending the one-time credential to the mobile device in response to receiving the indication that the mobile device has been synced.
16. The method of claim 15, further comprising:
   receiving an indication that the door was unlocked using the one-time credential; and
   preventing the one-time credential from being used to unlock the door in response to receiving the indication that the door was unlocked.
17. A method performed by an entry subsystem comprising one or more computers, the method comprising:
   obtaining information related to a navigation interface;
   sending the information related to the navigation interface to a mobile device; and
   receiving a request to unlock a door, the request being sent based on a communication session between an electronic device and the mobile device, the communication session being implemented in response to sending the information related to the navigation interface.
18. The method of claim 17, wherein the information related to the navigation interface is obtained from a virtual entry server.
19. The method of claim 17, wherein the request to unlock the door is received from the electronic device.
20. The method of claim 17, wherein the request to unlock the door is received from a virtual entry server, which receives the request from the electronic device.
21. The method of 17, wherein the request to unlock the door is received from a smart home device.
22. A virtual entry system comprising:
   a network;
   a virtual entry server in communication with the network; and
   an entry subsystem in communication with the network, the entry subsystem communicatively coupled to an electronic lock configured to selectively lock a lockable structure, the entry subsystem comprising:
- a microcontroller device comprising:
  - one or more processors;
  - one or more non-transitory machine-readable storage media;
  - a first network interface controller (NIC) configured to communicate with a first dynamic host configuration protocol (DHCP) server to receive a first DHCP address and configured to establish a virtual private network (VPN) connection for the electronic lock to communicate with a remote server, the first NIC configured to be communicatively coupled to the electronic lock; and
  - a second NIC configured to receive a second DHCP address from a second DHCP server running on the microcontroller device and send the second DHCP address to the electronic lock.

23. The virtual entry server of claim 22, wherein a first computing device in communication with the network is configured to receive information related to a navigation interface from the virtual entry server.

24. The virtual entry server of claim 23, wherein the first computing device is configured to receive the information related to a navigation interface using near-field communication (NFC), Bluetooth, or beacon technology.

25. The virtual entry server of claim 23, wherein the first computing device is configured to receive the information related to a navigation interface over a network.

26. The virtual entry server of claim 25, wherein the first computing device receives the information related to the navigation interface in response to an application of the first computing device determining that the first computing device is within a threshold distance of the entry subsystem.

27. The virtual entry server of claim 26, wherein the application of the first computing device includes a location based service that determines a geographic location of the first computing device.

28. The virtual entry server of claim 22, wherein a second computing device in communication with the network is configured to send a request to unlock the lockable structure to the virtual entry server over the network.

29. The virtual entry server of claim 28, wherein the virtual entry server is configured to send, to the entry subsystem over the network, instructions to unlock the lockable structure, in response to receiving the request to unlock the lockable structure.

30. The virtual entry server of claim 29, wherein the entry subsystem is configured to send a door unlock signal to the lockable structure in response to receiving the instructions to unlock the lockable structure.

31. The virtual entry server of claim 22, wherein the entry subsystem comprises the electronic lock.

32. The virtual entry server of claim 23, wherein the first computing device receives the information related to the navigation interface in response to scanning a barcode or QR code.

33. The virtual entry server of claim 23, wherein the information related to the navigation interface includes a selectable option to initiate an automated attendant system that dictates at least a portion of the information related to the navigation interface.

34. The virtual entry server of claim 33, wherein the portion of the information dictated by the automated attendant system includes one or more names of residents of a building.

35. The virtual entry server of claim 33, wherein the portion of the information dictated by the automated attendant system includes one or more unit numbers associated with residents of a building.

36. The virtual entry server of claim 22, wherein the microcontroller device further comprises a proximity card reader.

What is claimed is:

1. A method performed by a system of one or more computers for operating a virtual entry system for a building, the method comprising:
   - receiving, from a mobile device, a selection associated with information related to a navigation interface;
   - sending, to the mobile device in response to receiving the selection, information related to a communication interface, the information related to the communication interface including a meeting code;
   - receiving, from the mobile device, a first request to initiate a communication session between the mobile device and an electronic device, the first request including the meeting code;
   - initiating, based on the first request, a communication session between the mobile device and the electronic device; and
   - receiving a second request to unlock a door of the building in response to the communication session.

2. The method of claim 1, further comprising sending to a computing system, instructions to unlock a door of the building in response to receiving the second request.

3. The method of claim 1, wherein the second request is received from the electronic device.

4. The method of claim 1, wherein the second request is received from an additional electronic device.

5. The method of claim 1, further comprising sending to the mobile device information related to the navigation interface.

6. The method of claim 1, wherein the information related to the navigation interface includes one or more names of residents of the building.

7. The method of claim 1, wherein the information related to the navigation interface includes one or more unit numbers associated with residents of the building.

8. The method of claim 1, wherein the information related to the navigation interface includes a selectable option to call a particular entity of the building.

9. The method of claim 8, wherein the particular entity of the building is a leasing office or a front desk of the office.

10. The method of claim 1, wherein the mobile device receives the information related to the navigation interface through near-field communication, Bluetooth, or beacon technology.

11. The method of claim 1, wherein the mobile device receives the information related to the navigation interface in response to scanning a barcode or QR code.

12. The method of claim 1, wherein the information related to the navigation interface includes a selectable option to initiate an automated attendant system that dictates at least a portion of the information related to the navigation interface.

13. The method of claim 12, wherein the portion of the information dictated by the automated attendant system includes one or more names of residents of the building.

14. The method of claim 12, wherein the portion of the information dictated by the automated attendant system includes one or more unit numbers associated with residents of the building.

15. The method of claim 1, further comprising:
receiving, from the electronic device, a third request to generate a one-time credential for use in unlocking the door of the building;
generating the one-time credential in response to receiving the third request;
sending, to the mobile device, a request to sync the mobile device;
receiving an indication that the mobile device has been synced; and
sending the one-time credential to the mobile device in response to receiving the indication that the mobile device has been synced.

16. The method of claim 15, further comprising:
receiving an indication that the door was unlocked using the one-time credential; and
preventing the one-time credential from being used to unlock the door in response to receiving the indication that the door was unlocked.

17. A virtual entry system comprising:
a network;
a virtual entry server in communication with the network; and
an entry subsystem in communication with the network, the entry subsystem communicatively coupled to an electronic lock configured to selectively lock a lockable structure, the entry subsystem comprising:
a microcontroller device comprising:
one or more processors;
one or more non-transitory machine-readable storage media;
a first network interface controller (NIC) configured to communicate with a first dynamic host configuration protocol (DHCP) server to receive a first DHCP address and configured to establish a virtual private network (VPN) connection for the electronic lock to communicate with a remote server, the first NIC configured to be communicatively coupled to the electronic lock; and
a second NIC configured to receive a second DHCP address from a second DHCP server running on the microcontroller device and send the second DHCP address to the electronic lock.

18. The virtual entry system of claim 17, wherein a first computing device in communication with the network is configured to receive information related to a navigation interface from the virtual entry server.

19. The virtual entry system of claim 18, wherein the first computing device is configured to receive the information related to a navigation interface using near-field communication (NFC), Bluetooth, or beacon technology.

20. The virtual entry system of claim 18, wherein the first computing device is configured to receive the information related to a navigation interface over a network.

21. The virtual entry system of claim 20, wherein the first computing device receives the information related to the navigation interface in response to an application of the first computing device determining that the first computing device is within a threshold distance of the entry subsystem.

22. The virtual entry system of claim 21, wherein the application of the first computing device includes a location based service that determines a geographic location of the first computing device.

23. The virtual entry system of claim 17, wherein a second computing device in communication with the network is configured to send a request to unlock the lockable structure to the virtual entry server over the network.

24. The virtual entry system of claim 23, wherein the virtual entry server is configured to send, to the entry subsystem over the network, instructions to unlock the lockable structure, in response to receiving the request to unlock the lockable structure.

\* \* \* \* \*